United States Patent Office 3,456,221
Patented July 15, 1969

3,456,221
HIGH-VOLTAGE PULSE-GENERATING
TRANSFORMERS
John Christopher Martin, Tadley, and Ian Douglas Smith,
Reading, England, assignors to United Kingdom Atomic
Energy Authority, London, England
Filed Nov. 30, 1965, Ser. No. 510,481
Claims priority, application Great Britain, Dec. 9, 1964,
50,127/64
Int. Cl. H01f 15/14
U.S. Cl. 336—69                                    8 Claims This invention relates to transformers for generating high-voltage pulses and to pulse-generator circuits for use therewith, and has one application in the generation of pulses for operating flash X-ray tubes.

It is known to generate high-voltage pulses using, for example Marx generators, but such devices are bulky and expensive. It is also known to generate such pulses by discharging a capacitor through the primary winding of a step-up transformer, but in previous arrangements of this kind the problem of insulating the secondary winding to withstand the high voltages produced has resulted in transformers of large size having a high leakage inductance which has limited the attainable pulse rise-time. The present invention provides apparatus for this purpose of outstandingly small bulk and which is relatively inexpensive.

The present invention provides an auto-transformer suitable for the generation of high-voltage pulses comprising a winding formed of a conducting foil and an insulating sheet wound into a roll, output connections from the two ends of said winding and input connections to a central portion of said winding, said foil and sheet being immersed in a liquid adapted to prevent the formation of strong electric gradients at the foil edges. The central portion may be a single turn.

Preferably the liquid is slightly electrically conducting. Additionally or alternatively the liquid may have a high dielectric constant. For use with copper foil a weak solution of copper sulphate in water is preferred. The foil may taper from the centre towards each end to form a stepped configuration at the edges thereof.

A pulse-generator circuit according to the present invention comprises a transformer as aforesaid, storage capacitor means having a self-inductance which is small compared with the primary inductance of the transformer, and switch means for discharging said capacitor means through said central portion of the winding. Preferably the storage capacitor means is divided into two portions connected in series through said central portion of the winding, said switch means serving to connect together the other sides of said two portions.

To enable the nature of the present invention to be more readily understood, attention is directed, by way of example, to the accompanying drawing wherein.

Figure 1:
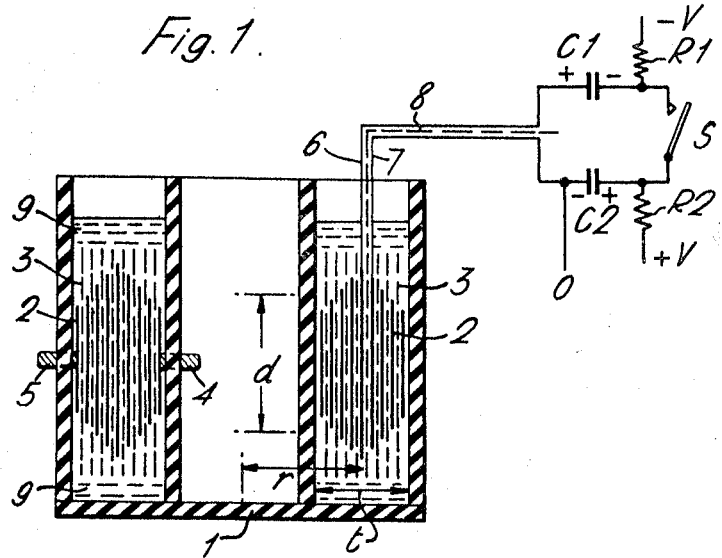
FIGURE 1 shows, as an embodment of the invention, a semi-diagrammatic sectional elevation of a transformer connected in a pulse-generator circuit.

Referring to FIGURE 1, an annular container 1 made of methylmethacrylate contains a multi-turn winding formed of copper foil 2 (shown as solid lines) and polyethylene terephthalate sheet 3 (shown as interrupted lines) wound into a tight roll so that adjacent turns of the foil are insulated from one another by the sheet. (FIGURE 1 shows the foil and sheet spaced from one another for clarity.) The inner and outer ends of the foil are connected to output terminals 4 and 5 respectively passing through the inner and outer walls of the annular container. The input connections to the transformer are made to the central turn of the winding by copper foil tabs 6 and 7 inserted into adjacent turns of the roll on a common radius and brought out of the top of the container 1 as a parallel-strip transmission line separated by a polyethylene terephthalate sheet 8. Tabs 6 and 7 connect storage capacitors C1 and C2 in series through the central turn of winding 2, the capacitors being charged to opposite polarities with respect to the central turn via charging resistors R1 and R2. Switch S is connected between the other sides of C1 and C2 so that when closed, the capacitors discharge in series through the central turn.

The foil 2 and sheet 3 are immersed in a very dilute solution 9 of copper sulphate in water. The solution is added to the container under vacuum conditions and at just above freezing point, to reduce the formation of bubbles and ensure that the solution penetrates as fully as possible between the turns of the sheet 3 to impregnate the winding.

The foil 2 tapers from its greatest width at the central turn to about ½–⅔ of this width at each end, to give the stepped edge configuration shown in FIGURE 1.

Figure 2:
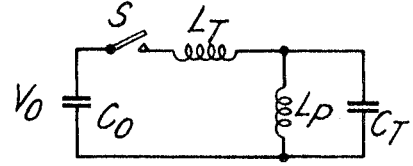
FIGURE 2 is a simplified equivalent circuit of the circuit of FIGURE 1.

In the equivalent circuit of FIGURE 2, $C_0$ represents the value of C1 and C2 in series (normally half the value of either, since they are made equal) $L_T = L_0 + L_1$ where $L_0$ is the self-inductance of $C_0$ and $L_1$ is the leakage inductance of the winding 2, $L_P$ is the primary inductance of winding 2, and $C_T = C_S + C_L$ where $C_S$ is the self-capacitance of winding 2 and $C_L$ is the load capacitance, both referred to the primary winding, i.e.

$$(C_{S_{real}} + C_{L_{real}}) \cdot n^2$$

where the quantities within the bracket are the actual values and $n$ is the turns ration (equal to the number of turns when the primary is a single turn as in the present embodiment).

The present type of transformer enables the volume of the annular winding 2 (including the interleaved insulation) to be made small compared with the volume of the cylindrical space which it encloses. To a rough approximation, the leakage inductance is proportional to the first of these volumes and the primary inductance to the second. The ratio of primary-to-leakage inductance can therefore be made high. As storage capacitors are now available with very low self-inductances, the present construction thus enables $L_P$ to be made large relative to $L_T$ without making the transformer itself physically large. It can also be readily arranged that $C_0$ is much larger than $C_T$.

Under these conditions, i.e. $L_P \gg L_T$ and $C_0 \gg C_T$, the circuit of FIGURE 2 has in effect two resonant modes. In the first mode $L_P$ can be neglected and $L_T$ resonates with $C_T$ and $C_0$ in series. Assuming $C_0$ initially charged to a voltage $V_0$, when S is closed a relatively high-frequency damped oscillation $$(1/f = 2\pi \sqrt{\frac{C_0 \cdot C_T}{C_0 + C_T} \cdot L_T}$$

where $f$ is the frequency) is produced giving a peak voltage of $2V_0$ across $C_T$.

Figure 3:
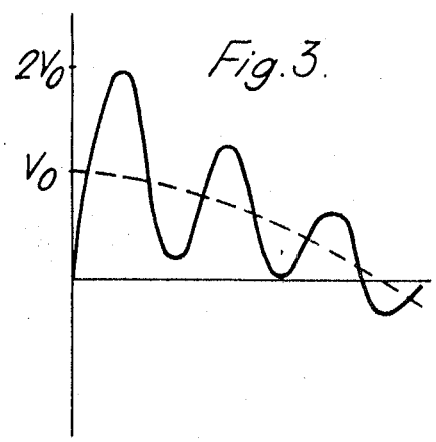
FIGURE 3 shows a waveform produced by the circuit of FIGURE 1.

In the other mode $L_T$ can be neglected and $L_P$ resonates with $C_T$ and $C_0$ in parallel to give a relative low-frequency oscillatiton $1/f = 2\pi \sqrt{(C_T + C_0) \cdot L_P}$ of peak amplitude $V_0$. FIGURE 3 shows the first quarter-cycle of the latter oscillation with the high-frequency damped oscillation superimposed upon it.

It will be seen that, provided there is sufficient difference between the frequencies, the first peak of the damped oscillation, which is the output pulse, has an amplitude of approximately $2V_0$, i.e. the theoretical maximum voltage gain of the transformer between input and output is approximately $2n$. This is an ideal case, with no transformer losses and no load. In practice the pain is very much less than this, mainly owing to any imposed load and also to losses comprising the effect of the primary circuit resistance and of the increase in capacitance of the secondary winding due to conduction in the impregnating solution, all of which have been neglected in the above simplified discussion. For optimum transfer of energy from a storage capacitor to a matched capacitive load, the maximum theoretical gain is $n$.

It has been found from both practical and theoretical considerations that a satisfactory form of transformer is one having its coil radius of the same order as the foil width, but this is by no means critical. It may be noted that the thickness $t$ of the winding 2 can be relatively small; for example a 40-turn winding using 2 thou copper and 5 thou insulating sheet is only about 0.3 inch thick.

As the production of the pulse submits the winding to a considerable mechanical shock, it is preferred to use a resilient material for the foil, annealed copper being preferable to aluminium.

The use of tapered foil produces a stepped-edge configuration which increases the separation between the edges of the turns and hence reduces the electric field gradient between them. This reduces the tendency for flashover to occur round the edges of the sheet 3. However, it is found that the addition of copper sulphate to render the water slightly conducting makes tapering less important and can render it unnecessary. The effect of the conducting solution is to produce a smooth charging wavefront of the capacitance formed across successive layers of the sheet 3 external to the edges of foil 2, by effectively connecting a "liquid film resistor" across each. The distributed resistance-capacitance system so formed causes the voltage wavefront of the charging waveform to move outwards from the foil edge, thus preventing the formation of high voltage gradients at these edges which could initiate flashover.

Water alone also has a beneficial effect, stemming from its high dielectric constant (81), which again prevents intense electric field gradients being produced at the edges of the foil. For comparison, the dielectric constant of transformer oil is about 2.4. (Glycerine, which also has a high dielectric constant (56), has also been used with success.) However the slightly conducting solution is even more effective, as already noted. The high dielectric constant of water also results in undesirable increase in the self-capacitance of the winding, but the use of an annular containing vessel minimises the volume of water used and hence also the increase in self-capacitance.

An advantage of the circuit shown in FIGURE 1 is that it is symmetrical about zero volts and hence that the insulation between the ends of the winding and earth is required to withstand only half of the total output voltage.

The advantage of the centre-fed autotransformer arrangement is that the maximum voltage to which the insulation of the "primary winding" can be subjected is a defined fraction of the voltage across the complete winding, because of the capacity-divider effect between the superimposed turns. If a separate primary winding were used, its potential relative to the secondary winding would be undefined, and any imbalance could cause breakdown of the insulation.

The parameters of two embodiments of the present invention were as follows:

(1)             CIRCUIT DATA $C1=C2=1$ μf. charged to 10 kv.

i.e.

$C_0=0.5$ μf.
$V_0=20$ kv.
$L_0=25$ nh.
$R$ (=effective resistance of $C_0$ and S) =0.03Ω

TRANSFORMER DATA

Means radius $(r)=3.6$ cm.
Means width $(d)=4$ cm. (tapering 6–2 cm.)
Turns=43
Open-circuit gain (after impregnation with $CuSO_4$ solution, and loaded with protective spark-gap and 6KΩ potentiometer chain for monitoring output) =26
Output pulse voltage=500 kv.
Pulse rise-time=0.1 μsec.

(2)             CIRCUIT DATA $C1=C2=10$ μf. charged to 10 kv.

i.e.

$C_0=5$μf.
$V_0=20$ kv.
$L_0=40$ nh.
$R$ (=same parameter as in (1))=0.06Ω

TRANSFORMER DATA

Mean radius $(r)=6$ cm.
Mean width $(d)=10$ cm. (tapering 13–7 cm.)
Turns=80
Open-circuit gain (conditions as for (1))=58
Output pulse voltage (for $V_0=16$ kV)=900 kV.
Pulse rise-time=0.2 μsec.

Both embodiments used 2 thou copper foil and 5 thou insulating sheet (Mylar). The impregnating solution was $CuSO_4$ in water and had a resistivity of 20KΩ per cube.

Figure 4:
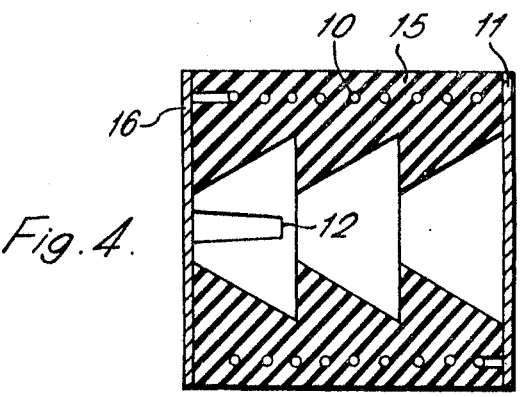
FIGURE 4 is a sectional elevation of a flash X-ray tube suitable for use with the present invention.

The present circuits are suitable for generating pulses to produce flash X-rays. For this purpose it is found that the use of flash X-ray tubes having a poor vacuum, as described for example in British Patent No. 1,034,014, is satisfactory provided the anode-cathode separation is increased to compensate for the increased pulse duration; otherwise the tube insulation breaks down. The effect of increasing the anode-cathode separation is to increase the anode spot size, but this can be reduced by applying an axial magnetic field to focus the electron beam. This field can be generated by energising a focussing winding arranged coaxially with the beam, from either the output of winding 2 or directly from capacitors C1 and C2. FIGURE 4 shows one such arrangement in which the focussing winding 10 is moulded into a three-section, angled, methylmethacrylate annular insulator 15 separating the anode plate 11 from the cathode plate 16; the field-emission cathode 12 projects from the latter. The anode proper is a tantalum disc (not shown) mounted on the anode plate 11. Winding 10 is connected at one end to plate 16 and at the other to plate 11, so that it is energised by the output of winding 2. Typically cathode 12 is located 6–10 cm. from plate 11, winding 10 producing an axial field of about 3 kgauss. If necessary, two intermediate plates can be inserted between the insulator sections to ensure even potential distribution across the insulator (as described in the abovementioned application), connected to tappings on winding 10.

We claim:
1. A pulse-transformer suitable for the generation of high-voltage pulses comprising a winding formed of a conducting foil and an insulating sheet would into a roll, output connections from the two ends of said winding and input connections to a central portion of said winding, said foil and sheet being immersed in a liquid which contains an additive to render it electrically conducting which liquid reduces the strength of the electric gradients at the edges of the foil.

2. An auto-transformer as claimed in claim 1 wherein said liquid is water and said additive is a water-soluble salt of the metal of which said conducting foil is made.

3. An auto-transformer as claimed in claim 2 wherein said foil is made of copper and said salt is copper sulphate.

4. An auto-transformer as claimed in claim 1 in which said winding and liquid are contained in an annular vessel.

5. An auto-transformer as claimed in claim 1 wherein the foil tapers from the centre towards each end thereof to form a stepped configuration at the edges of the winding.

6. A pulse-transformer suitable for the generation of high-voltage pulses comprising an output winding formed of a conducting foil and an insulating sheet wound into a roll, output connections from the two ends of said winding, said foil and sheet being immersed in a liquid which reduces the strength of the electric field gradients at the edges of the foil, said liquid having a very high dielectric constant relative to that of transformer oil.

7. A pulse-transformer as claimed in claim 6 in which said winding and said liquid are contained in an annular vessel.

8. A pulse-transformer as claimed in claim 6 wherein the foil tapers from the center towards each end thereof to form a stepped configuration at the edges of the winding.

References Cited

UNITED STATES PATENTS

| | | | |
|---|---|---|---|
| 1,440,760 | 1/1923 | Wright | 336—206 |
| 1,841,070 | 1/1932 | Story et al. | 336—94 XR |
| 2,981,910 | 4/1961 | Rabins | 336—206 XR |
| 3,086,184 | 4/1963 | Nichols | 336—206 XR |

LEWIS H. MYERS, Primary Examiner

T. J. KOZMA, Assistant Examiner

U.S. Cl. X.R.

336—94, 206, 223